(12) United States Patent
Matsushita et al.

(10) Patent No.: US 7,826,140 B2
(45) Date of Patent: Nov. 2, 2010

(54) LASER MARKING DEVICE

(75) Inventors: Kazunori Matsushita, Hitachinaka (JP);
Takashi Nishimura, Hitachinaka (JP);
Noritaka Tadano, Hitachinaka (JP);
Yutaka Ito, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 6 days.

(21) Appl. No.: 11/914,251

(22) PCT Filed: May 12, 2006

(86) PCT No.: PCT/JP2006/309983

§ 371 (c)(1),
(2), (4) Date: Nov. 18, 2008

(87) PCT Pub. No.: WO2006/121215

PCT Pub. Date: Nov. 16, 2006

(65) Prior Publication Data

US 2009/0147369 A1    Jun. 11, 2009

(30) Foreign Application Priority Data

May 13, 2005    (JP)    ............................ 2005-140472

(51) Int. Cl.
*G02B 27/14* (2006.01)
(52) U.S. Cl. ...................... 359/629; 359/634
(58) Field of Classification Search ............... 359/629, 359/495, 618, 634; 33/227
See application file for complete search history.

(56) References Cited

U.S. PATENT DOCUMENTS

| 5,808,798 | A | | 9/1998 | Weber et al. |
| 5,984,484 | A | * | 11/1999 | Kruer .............................. 362/1 |
| 6,622,392 | B1 | * | 9/2003 | Bourget ........................ 33/293 |
| 6,970,294 | B2 | * | 11/2005 | Nishimura ................... 359/629 |

FOREIGN PATENT DOCUMENTS

| DE | 23 66 434 | 1/1975 |
| JP | 1-92702 | 4/1989 |
| JP | 10-141957 | 5/1998 |
| JP | 2003-329816 | 11/2003 |

OTHER PUBLICATIONS

Azzam, "Simultaneous Reflection and Refraction of Light Without Change of Polarization by a Single-layer-Coated Dielectric Surface," Opt. Lett. 10, 107-109 (1985).

(Continued)

*Primary Examiner*—Jack Dinh
(74) *Attorney, Agent, or Firm*—Antonelli, Terry, Stout & Kraus, LLP.

(57) ABSTRACT

A laser marking device (1) includes a laser light source (24) that emits a laser beam, and a beam splitter (230) receiving the laser beam and allowing a part of the laser beam to be reflected thereat and a remaining part of the laser beam to be transmitted therethorogh. The beam splitter (230) has an unpolarized film (233a, 233b) into which the laser beam is entered to divide the laser beam into a plurality of laser beams that travels in different directions, at a predetermined rate regardless of change of a polarized characteristic of the laser beam.

10 Claims, 4 Drawing Sheets

OTHER PUBLICATIONS

Azzam, "Variable-reflectance thin-film polarization-independent beam splitters for 0.6328- and 10.6μm laser light," Opt. Lett. 10, 110-112, (1985).

Ciosek, J. et al "Design and manufacture of all-dielectric nonpolarising beam splitters," Appl. Opt. 38(7), 124401250 (1999).

Ho and Dobrowolski, "Neutral and Colour-selective beam splitting assemblies with polarization-independent intensities," Appl. Opt. 31, 3813-3820 (1992).

* cited by examiner

LASER MARKING DEVICE

TECHNICAL FIELD

The present invention relates to a laser marking device for dividing a laser beam from a light source into a plurality of line beams.

BACKGROUND ART

Recently, laser marking devices for projecting a straight line at a wall or the like with a laser beam have been used in a marking operation for drawing a reference line in construction sites. For example, Japanese unexamined Patent Application Publication No. 10-141957a discloses a laser marking device configured so that a lens tube member that mounts a laser optical system through a gyro mechanism at its base is supported in a suspended state and the laser optical system can emit a ceiling face projecting beam, a floor face projecting beam and a side wall projecting beam to a ceiling face, a floor face and a side wall, respectively, at the same time. The laser optical system includes a single laser light source, a polarizing means for polarizing a laser beam emitted from the laser light source into an upward vertical beam, a downward vertical beam and a horizontal beam and a vertical axis adjusting means for adjusting the ceiling face projecting beam and the floor face projecting beam on a single vertical axis. The lens tube member is horizontally suspended by the gyro mechanism.

Japanese unexamined Patent Application Publication No. 2003-329816 discloses a polarizing means obtained by bonding or sticking a plurality of members made of glass or plastic that passes light therethrough together so as to be shaped like a rectangular parallelepiped as a whole.

In the conventional laser marking devices, a laser light source that emits red laser light is generally used. However, when such light source is used in an outdoor or brightly lit construction site, a line beam is disadvantageously hard to be seen and thus, a laser marking device that uses green laser light having excellent visibility has been considered. At this time, since the light source using green laser light is large and expensive, as disclosed in Japanese unexamined Patent Application Publication No. 10-141957a, etc., it has been considered to divide a beam emitted from a single light source into a plurality of laser beams.

However, it is found that, when the green laser light source is used, the intensity of each laser beam that is reflected on or passes through the polarizing means (splitters) disclosed in Japanese unexamined Patent Application Publications No. 10-141957a and No. 2003-329816 varies depending on a change in the polarization characteristics of the laser beam according to temperatures, impairing the usability of the laser marking device. Further, the splitter disclosed in Japanese unexamined Patent Application Publication No. 2003-329816 can be broken, when the splitter is fixing at the lens tube member.

DISCLOSURE OF THE INVENTION

In view of the above-described drawbacks, it is an objective of the present invention to provide a laser marking device using a green laser beam with excellent visibility that can prevent a change in the intensity of the line beam even when variation of the polarization characteristics of the laser beam is caused by temperature change. Another object of the present invention is to provide a laser marking device can prevent a splitter from being damaged.

In order to attain the above and other objects, the present invention provides a laser marking device includes a laser light source that emits a laser beam, and a beam splitter receiving the laser beam and allowing a part of the laser beam to be reflected thereat and a remaining part of the laser beam to be transmitted therethorogh. The beam splitter has an unpolarized film into which the laser beam is entered to divide the laser beam into a plurality of laser beams that travels in different directions, at a predetermined rate regardless of change of a polarized characteristic of the laser beam.

BRIEF DESCRIPTION OF DRAWINGS

The above and other objects, features and advantages of the invention will become more apparent from reading the following description of the preferred embodiments taken in connection with the accompanying drawings in which.

BEST MODE FOR CARRYING OUT THE INVENTION

Figure 1:
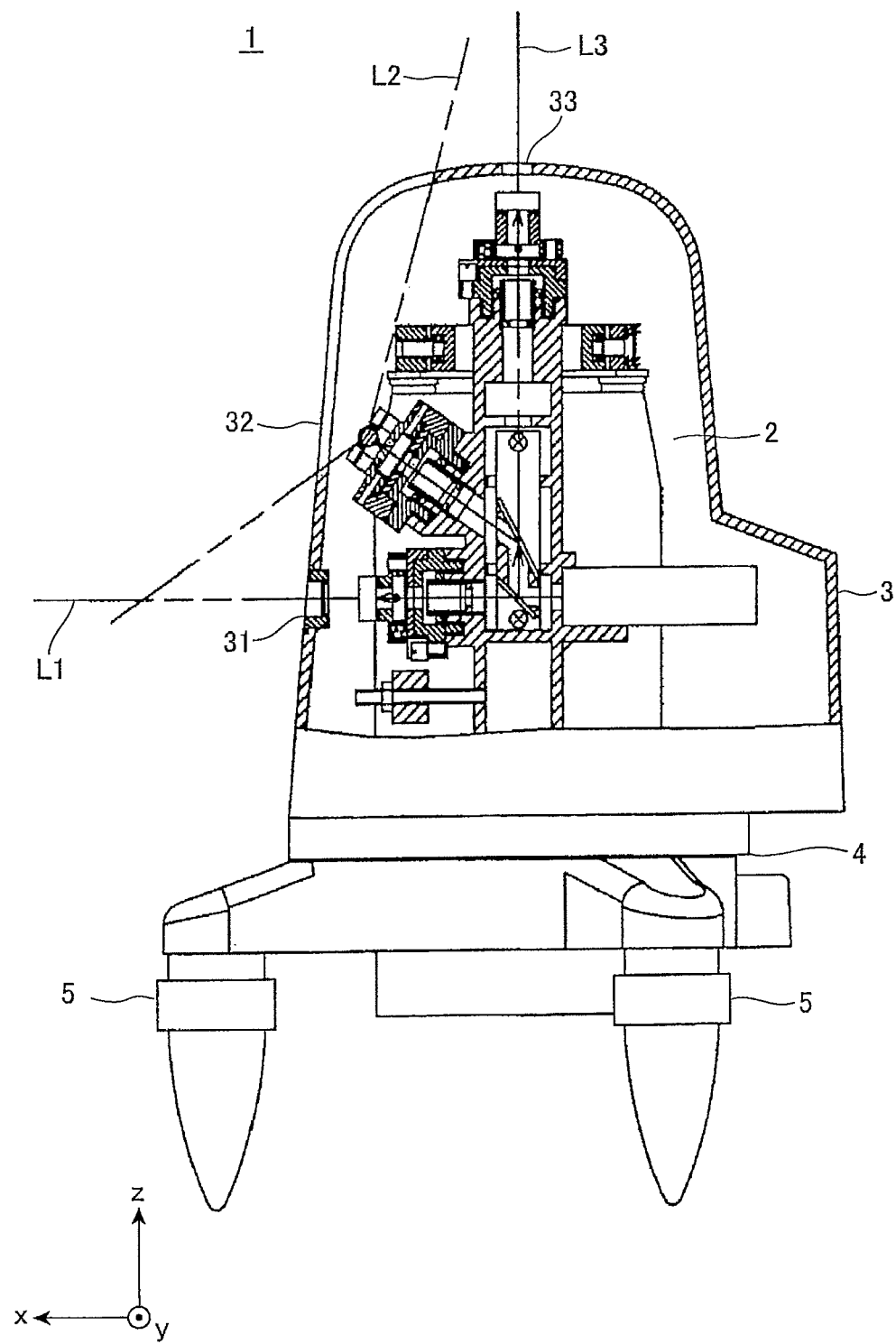
FIG. 1 is a partial sectional view of the laser marking device 1 in accordance with an embodiment.

A laser marking device according to preferred embodiments of the present invention will be described while referring to the accompanying FIG. 1 to FIG. 4 wherein like parts and components are designated by the same reference numerals to avoid duplicating description.

FIG. 1 is a partial sectional view of the laser marking device 1. In this embodiment, the left side on the sheet, the near side on the sheet and the upper side on the sheet are regarded as an X-axis normal direction, a Y-axis normal direction and a Z-axis normal direction, respectively.

The laser marking device 1 includes a main unit 2, a housing 3, a base 4 and stands 5. The main unit 2 is mounted on the base 4 and covered with the housing 3 so as not to be exposed to the outside. Windows 31, 32 and 33 through which line beams L1, L2 and L3 pass, respectively, are formed at the housing 3. The windows 31, 32 and 33 are band-like. The window 31 is formed on the left side face of the housing 3 in FIG. 1 so as to be parallel to the XY plane. The window 32 is formed on the left side face of the housing 3 in FIG. 1 so as to be parallel to the XZ plane. The window 33 is formed at the upper end of the housing 3 in FIG. 1 so as to be parallel to the YZ plane. The base 4 is rotatable and supported by the plurality of stands 5.

Figure 2:
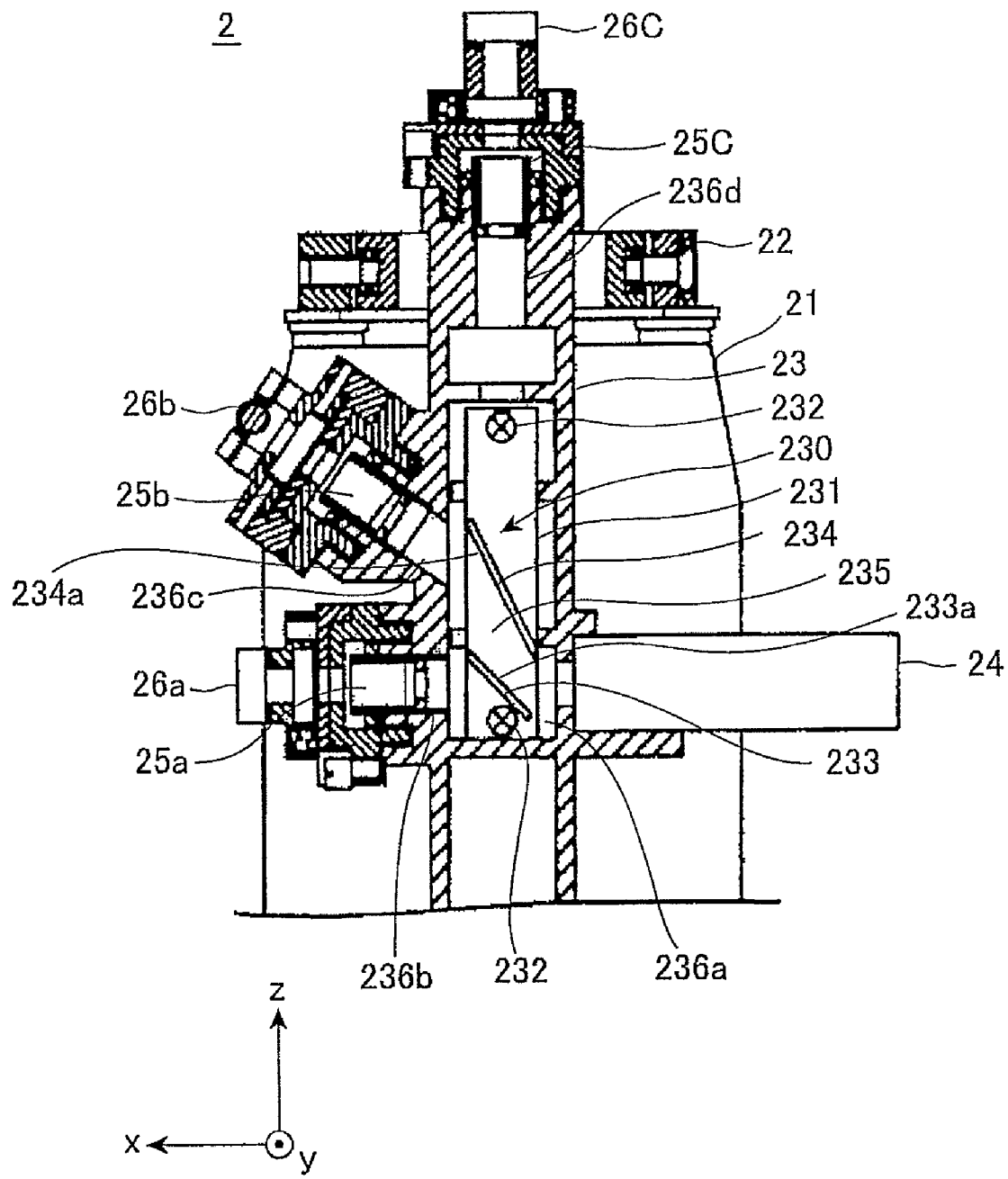
FIG. 2 is an enlarged sectional view of a main unit 2.
Figure 3:
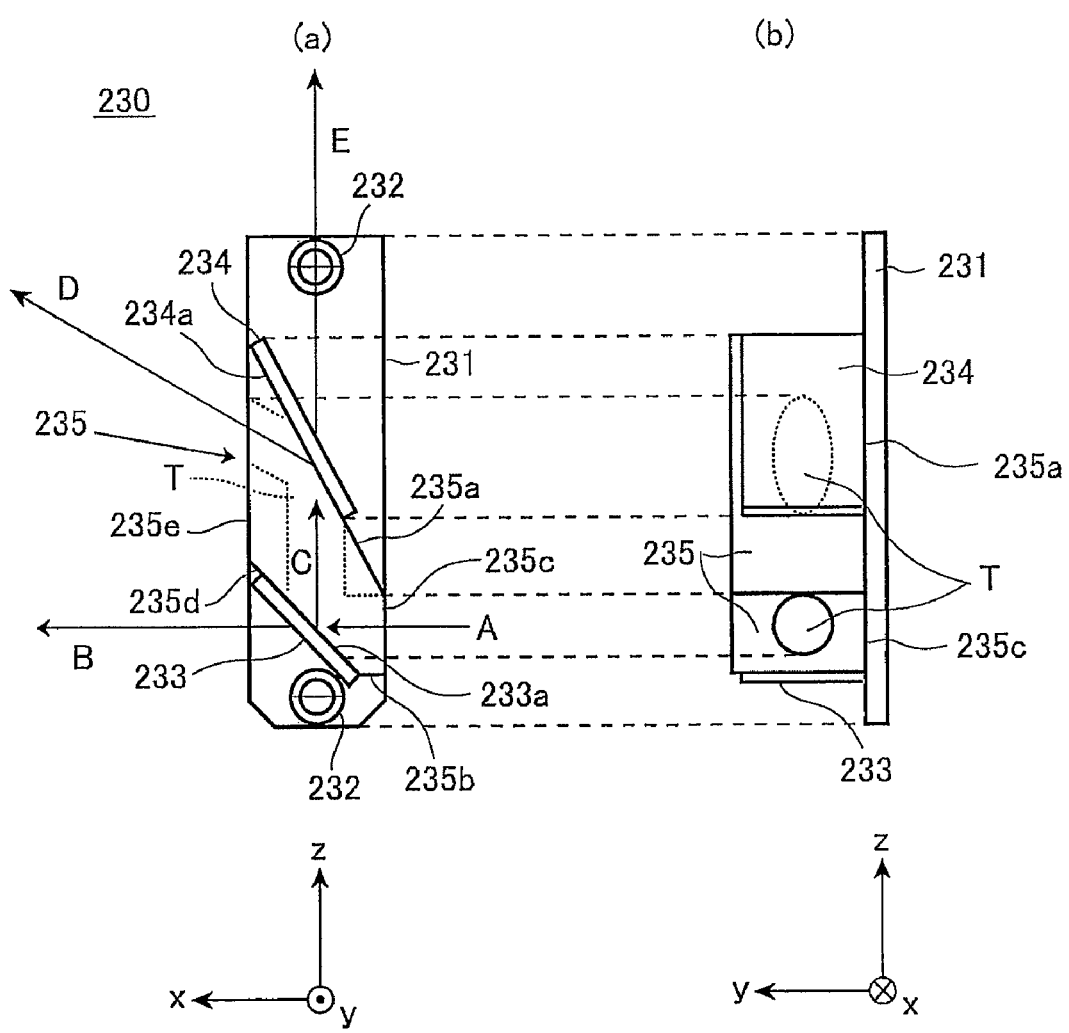
FIG. 3 is an explanation view of a beam splitter 230.

FIG. 2 is an enlarged sectional view of the main unit 2. The main unit 2 includes a frame 21, a gimbal mechanism 22, a body tube 23, a laser light source 24, wedge prisms 25*a*, 25*b* and 25*c* and wide-angle lenses 26*a*, 26*b* and 26*c*. The frame 21 is vertically mounted on the base 4 and the gimbal mechanism 22 is mounted so as to be movable in the X direction and the Y direction. The body tube 23 is suspended by the gimbal mechanism 22 so as to be kept horizontal relative to the ground at all times.

The body tube 23 is shaped like a hollow square pole and includes a beam splitter 230 configured of a holder 231, a first half mirror 233, a second half mirror 234 and a tunnel forming part 235 therein. The body tube 23 is formed with a beam incoming part 236*a* into which the laser beam incomes and beam emitting parts 236*b*, 236*c* and 236*d* for emitting the laser beams divided by the first half mirror 233 and the second half mirror 234.

The laser light source 24 for emitting the laser beam into the body tube 23 is connected to the beam incoming part 236a of the body tube 23 at an angle at which the laser beam can be emitted into the body tube 23 in parallel to the X axis. The deviation wedge prisms 25a, 25b and 25c for fine adjusting the direction of the laser beams emitted from the body tube 23 are connected to the beam emitting parts 236b, 236c and 236d, respectively. Furthermore, the wide-angle lenses 26a, 26b and 26c for converting the laser beams emitted from the body tube 23 into line beams are connected to the wedge prisms 25a, 25b and 25c, respectively.

FIG. 3(a) is a plan view of the beam splitter 230 and FIG. 3(b) is a side view of the beam splitter 230. The holder 231 is a rectangular aluminum sheet and is fixed at the inner face of the body tube 23 with a screw 232 so as to be parallel to the XZ plane and longitudinally oriented in the Z-axis direction. A face of the holder 231 that is not in contact with the body tube 23 is subjected to anodic oxide coating for preventing diffuse reflection of the laser beam. Furthermore, a first groove and a second groove (not shown) are formed on the face of the holder 231 that is not in contact with the body tube 23. A first transmission/reflection plate 233 and a second transmission/reflection 234 plate are engaged into the first groove and the second groove respectively. The first groove is formed so as to form an angle of 45 degrees relative to the Z axis and the second groove is formed so as to form an angle of about 30 degrees relative to the Z axis.

The first half mirror 233 and the second half mirror 234 are rectangular transmission/reflection plates and has a face to which an unpolarized film is added. The first half mirror 233 and the second half mirror 234 are fixed at the first groove and the second groove, respectively, with UV adhesion, vertically relative to the holder 231, that is, in the Y-axis direction so that the laser beam may enter to the face to which the unpolarized film is added. Accordingly, the first half mirror 233 is fixed so as to form an angle of 45 degrees relative to the Z axis and the second half mirror 234 is formed so as to form an angle of about 30 degrees relative to the Z axis.

The tunnel forming part 235 is arranged between the first half mirror 233 and the second half mirror 234. Describing in detail, in FIG. 3(a), the tunnel forming part 235 is shaped like a rectangular column that extends from the holder 231 in the Y-axis direction and has a face surrounded by a first side 235a extending from the left end to the right end of the holder 231 along the second half mirror 234, a second side 235b extending from the right end of the first half mirror 233 to the right end of the holder 231 in parallel to the X axis, a third side 235c connecting the right end of the first side 235a to the right end of the second side 235b, a fourth side 235d extending from the left end of the second side 235b to the left end of the holder 231 along the first half mirror 233 and a fifth side 235e connecting the left end of the first side 235a to the left end of the fourth side 235d as a bottom face. As shown in FIG. 3(b), the height of the tunnel forming part 235 in the Y-axis direction is larger than that of the first half mirror 233 and the second half mirror 234 in the Y-axis direction.

A tunnel T for passing the laser beam emitted from the laser light source 24 therethrough is formed on the tunnel forming part 235 (represented by a smaller dotted line in FIG. 3(a)). In detail, the tunnel T is formed so that the laser beam may be reflected on the first half mirror 233, go forward the second half mirror 234 to be reflected thereon and be emitted in an outward desired direction. The holder 231 and the tunnel forming part 235 are formed in an integral fashion. An inner face of the tunnel forming part 235, on which the tunnel T is formed, is subjected to anodic oxide coating. With such configuration, since the tunnel T is subjected to anodic oxide coating, it can prevent diffuse reflection of the laser beam from occurring. Thus, noise light due to diffuse reflection is reduced and the light emitted from the beam splitter becomes a high-quality laser beam.

In this embodiment, unpolarized films 233a and 234a are formed on the opposed faces of the first half mirror 233 and the second half mirror 234, respectively. The unpolarized films 233a and 234a divide the incoming laser beam into transmitted light and reflected light at a constant rate irrespective of the polarizing characteristics of the incoming laser beam. In this embodiment, the unpolarized film adhered to the first half mirror 233 allows one-third of the incident laser beam to pass therethrough and two-thirds to reflect thereon and the unpolarized coating film adhered to the second half mirror 234 allows one-half of the incident laser beam to pass therethrough and one-half to reflect thereon.

For example, the beam splitter described in Japanese unexamined Patent Application Publication No. 2003-329816 is configured by forming a polarized film on a bonded face of a glass block. On the other hand, the beam splitter 230 in this embodiment is formed of the first half mirror 233 and the second half mirror 234 as transmission/reflection plates. Thus, problems such as damage of glasses due to the pressure generated in bonding the glasses to each other and separation of the glasses due to lack in pressure can be prevented. In addition, when the beam splitter is a glass block, it is difficult to add the polarized coating film to the bonded face having an angle of about 30 degrees. However, in the beam splitter 230 in this embodiment, angular adjustment is facilitated. Furthermore, unlike the conventional beam splitter formed of the glass block, the beam splitter 230 in this embodiment has the configuration in which the holder 231 as a flat plate is fixed to the body tube 23. For this reason, operations such as fixation of the splitter to the body tube 23, positional adjustment and replacement becomes easier.

Subsequently, a flow of the laser beam emitted from the laser light source 24 will be described with reference to FIG. 1, FIG. 2, FIG. 3 and FIG. 4. In this embodiment, the laser light source 24 emits a green laser beam having a wavelength of 532 nm. A laser beam A (FIG. 3(a)) emitted from the laser light source 24 (FIG. 2) enters the first half mirror 233. A part of the laser beam A that enters the first half mirror 233 passes through the first half mirror 233 and enters the wedge prism 25a and the wide-angle lens 26a (FIG. 2) as a laser beam B. The laser beam B is converted into a line beam L1 in the direction of the XY plane by the wide-angle lens 26a and the converted line beam L1 is emitted through the window 31 (FIG. 1).

On the other hand, a remaining part of the laser beam A is reflected on the first half mirror 233 in the Z-axis direction and enters the second half mirror 234 as a laser beam C. A part of the laser beam C is reflected on the second half mirror 234 at an angle of about 30 degrees relative to the second half mirror 234 and enters the wedge prism 25b and the wide-angle lens 26b as a laser beam D. The laser beam D is converted into a line beam L2 in the direction of the XZ plane by the wide-angle lens 26b and the converted line beam L2 is emitted through the window 32.

Figure 4:
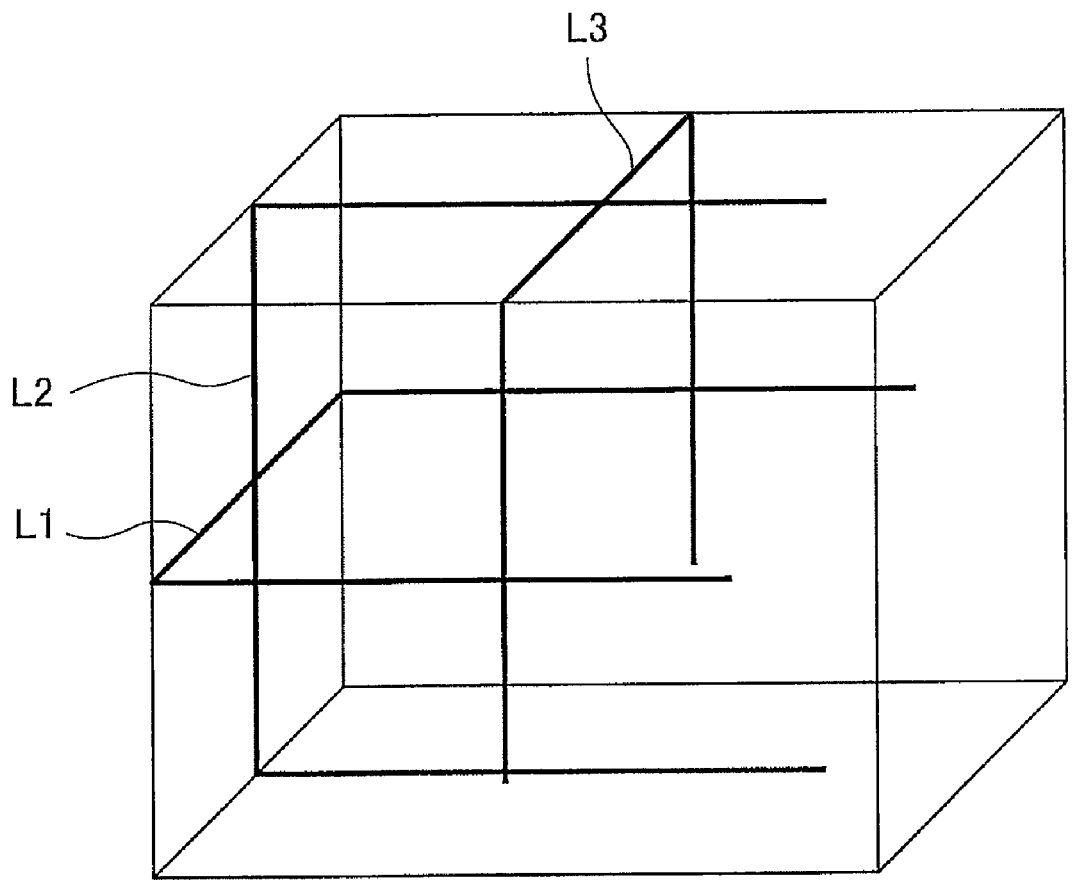
FIG. 4 is a view for describing line beams L1, L2 and L3 emitted from the laser marking device 1.
Figure 4:
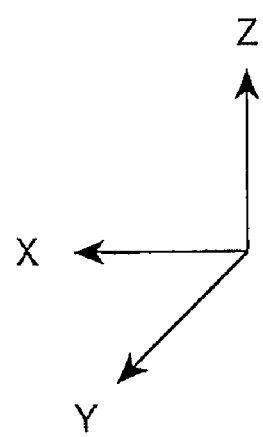

On the other hand, a remaining part of the laser beam C passes through the second half mirror 234 and enters the wedge prism 25c and the wide-angle lens 26c as a laser beam E. The laser beam E is converted into a line beam L3 and the converted line beam L3 is emitted through the window 33. Each of the line beams L1, L2 and L3 thus emitted is projected on an external wall face or the like as shown in FIG. 4.

In this embodiment, the unpolarized film adhered to the first half mirror 233 allows one-third of the incident laser beam to pass therethrough and two-thirds to reflect thereon and the unpolarized film adhered to the second half mirror 234 allows one-half of the incident laser beam to pass therethrough and one-half to reflect thereon. Thus, the light amount of each of the line beams L1, L2 and L3 becomes equal.

The polarizing characteristics of the laser beam vary with change in temperature. Conventionally, the polarized film is added to the beam splitter. Therefore, even when the beam splitter is designed so that the light amount of a plurality of line beams may be equal to each other, the rate of the transmitted light to the reflected light varies with change in the polarizing characteristics of the laser beams due to change in temperature, thereby causing a difference among the light amount of the plurality of line beams. The sum of the light amount of the plurality of line beams is equal to the light amount of the laser beam emitted from the laser light source. Thus, for example, when the light amount of one line beam is decreased with change in temperature, the amount of the other line beams is increased. As a result, the increase in the light amount may impair usability.

However, in the laser marking device 1 in this embodiment, the unpolarized film is added to the first half mirror 233 and the second half mirror 234, respectively, which each laser beam enters. Thus, even when the polarizing characteristics of the laser beams vary with change in temperature or the like, each laser beam is divided into transmitted light and reflected light at a constant rate at all times. As a result, the laser marking device 1 can project the line beam of an accurate amount of light on the wall face or the like at any time.

In this embodiment, the green laser beam having more excellent visibility than a red laser beam is used as a laser beam. Generally, when a plurality of line beams are emitted from the red laser beam, a laser light source is provided in the emitting direction of each line beam without dividing the laser by the beam splitter. Thus, since no influence of the polarizing element (beam splitter) occurs even when the polarizing characteristics vary, it is unnecessary to consider change in the intensity of the laser beam. This is due to that the laser light source for emitting the red laser beam is compact and inexpensive. On the contrary, since the green laser beam is relatively large and expensive, it is undesirable to use a plurality of laser light sources as in the red laser beam. However, even with the inexpensive configuration using the beam splitter, the laser marking device 1 in this embodiment can emit the green laser beam without coming under the influence of change in the polarizing characteristics of the laser beam. Furthermore, since the green laser beam has more excellent visibility than the red laser beam, an efficient operation can be made.

While the invention has been described in detail with reference to the specific embodiment thereof, it would be apparent to those skilled in the art that various changes and modifications may be made therein without departing from the spirit of the invention.

For example, the unpolarized film is added to the first half mirror 233 and the second half mirror 234. However, the unpolarized film is deposited to the first half mirror 233 and the second half mirror 234.

The invention claimed is:

1. A laser marking device comprising:
a laser light source that emits a laser beam; and
a beam splitter receiving the laser beam, and allowing a part of the laser beam to be reflected at the beam splitter and a remaining part of the laser beam to be transmitted through the beam splitter, the beam splitter including an unpolarized film into which the laser beam enters and which is configured to divide the laser beam into a plurality of laser beams that travel in different directions.

2. The laser marking device according to claim 1,
wherein the beam splitter comprises a holder that supports the unpolarized film at a predetermined angle relative to the laser beam entering the unpolarized film.

3. The laser marking device according to claim 2,
wherein the holder forms a tunnel through which the laser beam passes, and the holder includes an inner surface coated with anodic oxide, the inner surface defining the tunnel.

4. The laser marking device according to claim 1, wherein the laser light source emits a laser beam having a wavelength of 532 nm.

5. The laser marking device according to claim 1, further comprising:
a wide-angle lens that converts the laser beams divided by the beam splitter into line beams; and a vertical mechanism that supports the beam splitter so that the line beams are emitted at prescribed angles relative to a horizontal plane.

6. A laser marking device comprising:
a laser light source that emits a first laser beam; and
a beam splitter receiving the first laser beam, and allowing a part of the first laser beam to be reflected at the beam splitter and a remaining part of the first laser beam to be transmitted through the beam splitter, the beam splitter including an unpolarized film into which the first laser beam enters and which is configured to divide the first laser beam into a plurality of second laser beams that travel in different directions and which second laser beams remain constant in intensity regardless of changes in polarization of the first laser beam.

7. The laser marking device according to claim 6,
wherein the beam splitter comprises a holder that supports the unpolarized film at a predetermined angle to the first laser beam entering the unpolarized film.

8. The laser marking device according to claim 7,
wherein the holder forms a tunnel through which the first laser beam passes, and the holder includes an inner surface coated with anodic oxide, the inner surface defining the tunnel.

9. The laser marking device according to claim 6,
wherein the laser light source emits the first laser beam having a wavelength of 532 nm.

10. The laser marking device according to claim 6, further comprising:
a wide-angle lens that converts the second laser beams divided by the beam splitter into line beams; and
a vertical mechanism that supports the beam splitter so that the line beams are emitted at prescribed angles relative to a horizontal plane.

* * * * *